(12) United States Patent
Vincent et al.

(10) Patent No.: US 8,244,589 B2
(45) Date of Patent: Aug. 14, 2012

(54) PERSONALIZED AUDIO CONTROLLED SHOPPING INFORMATION SERVICE FOR A MOBILE DEVICE

(75) Inventors: Daevid Vincent, Redmond, WA (US); Evan McClendon Webb Phoenix, Los Angeles, CA (US)

(73) Assignee: Daevid Vincent, Redmond, WA (US)

( * ) Notice: Subject to any disclaimer, the term of this patent is extended or adjusted under 35 U.S.C. 154(b) by 1191 days.

(21) Appl. No.: 11/846,150

(22) Filed: Aug. 28, 2007

(65) Prior Publication Data
US 2008/0065486 A1    Mar. 13, 2008

Related U.S. Application Data

(60) Provisional application No. 60/823,892, filed on Aug. 29, 2006.

(51) Int. Cl.
*G06Q 30/00*    (2012.01)

(52) U.S. Cl. ............... 705/26.1; 705/26.27; 705/27.1; 705/14.1; 705/14.4; 705/14.72; 455/414.1

(58) Field of Classification Search .......... 705/26.1, 705/26, 27, 27.1, 14.1, 14.4, 14.72; 455/414.1
See application file for complete search history.

(56) References Cited

U.S. PATENT DOCUMENTS

| 6,101,381 | A | 8/2000 | Tajima et al. |
|---|---|---|---|
| 6,701,366 | B1 | 3/2004 | Kallas et al. |
| 6,993,290 | B1 | 1/2006 | Gebis et al. |
| 6,993,575 | B2 * | 1/2006 | Abkowitz et al. ............. 709/220 |
| 7,120,636 | B2 * | 10/2006 | Pendleton ............................. 1/1 |
| 7,664,488 | B2 * | 2/2010 | Zellner et al. ............. 455/414.1 |
| 2003/0093323 | A1 | 5/2003 | Kenyon |
| 2003/0187755 | A1 * | 10/2003 | Acharya et al. ................. 705/27 |
| 2007/0203736 | A1 * | 8/2007 | Ashton ............................. 705/1 |
| 2011/0119138 | A1 * | 5/2011 | Rakers et al. ............. 705/14.72 |

FOREIGN PATENT DOCUMENTS
JP    11041170    2/1999

* cited by examiner

*Primary Examiner* — Yogesh C Garg
(74) *Attorney, Agent, or Firm* — Frommer Lawrence & Haug LLP; John W. Branch

(57) ABSTRACT

A device, system, and method are directed towards providing shopping information regarding an item over a network to a mobile device. A review of the item in at least one of a plurality of formats is received. A user is enabled to select at least a portion of the shopping information in one of a plurality of selectable formats based at least in part on a user input command at the mobile device. The review may is at least one selectable portion of the shopping information. A request for at least the portion of the shopping information for the item in a selected format is received from the mobile device associated with the user. Audio is at least one of the plurality of selectable formats. The requested portion of the shopping information in the selected format is provided to the mobile device, in response to the request.

20 Claims, 11 Drawing Sheets

Advertising model:

| Level | Web advertisement | Voice advertisement | Subscription amount |
|---|---|---|---|
| Free | Full | Full | Free |
| Assisted 0 | Some or none | Some | Medium amount |
| Assisted 1 | Some | Some or none | Medium amount |
| Subscription | None | None | Full amount |

*FIG. 8*

PERSONALIZED AUDIO CONTROLLED SHOPPING INFORMATION SERVICE FOR A MOBILE DEVICE

CROSS-REFERENCE TO RELATED APPLICATION

This application is a Utility Patent application based on a previously filed U.S. Provisional Patent Application, Ser. No. 60/823,892 filed on Aug. 29, 2006, the benefit of which is hereby claimed under 35 U.S.C. §119(e).

FIELD OF THE INVENTION

The present invention relates generally to mobile search and, more particularly, but not exclusively to providing shopping information over a network.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 8 shows a table, which may be used to determine the type of advertising to provide a customer based on a subscription level chosen by a customer;

DETAILED DESCRIPTION OF THE INVENTION

Figure 1:
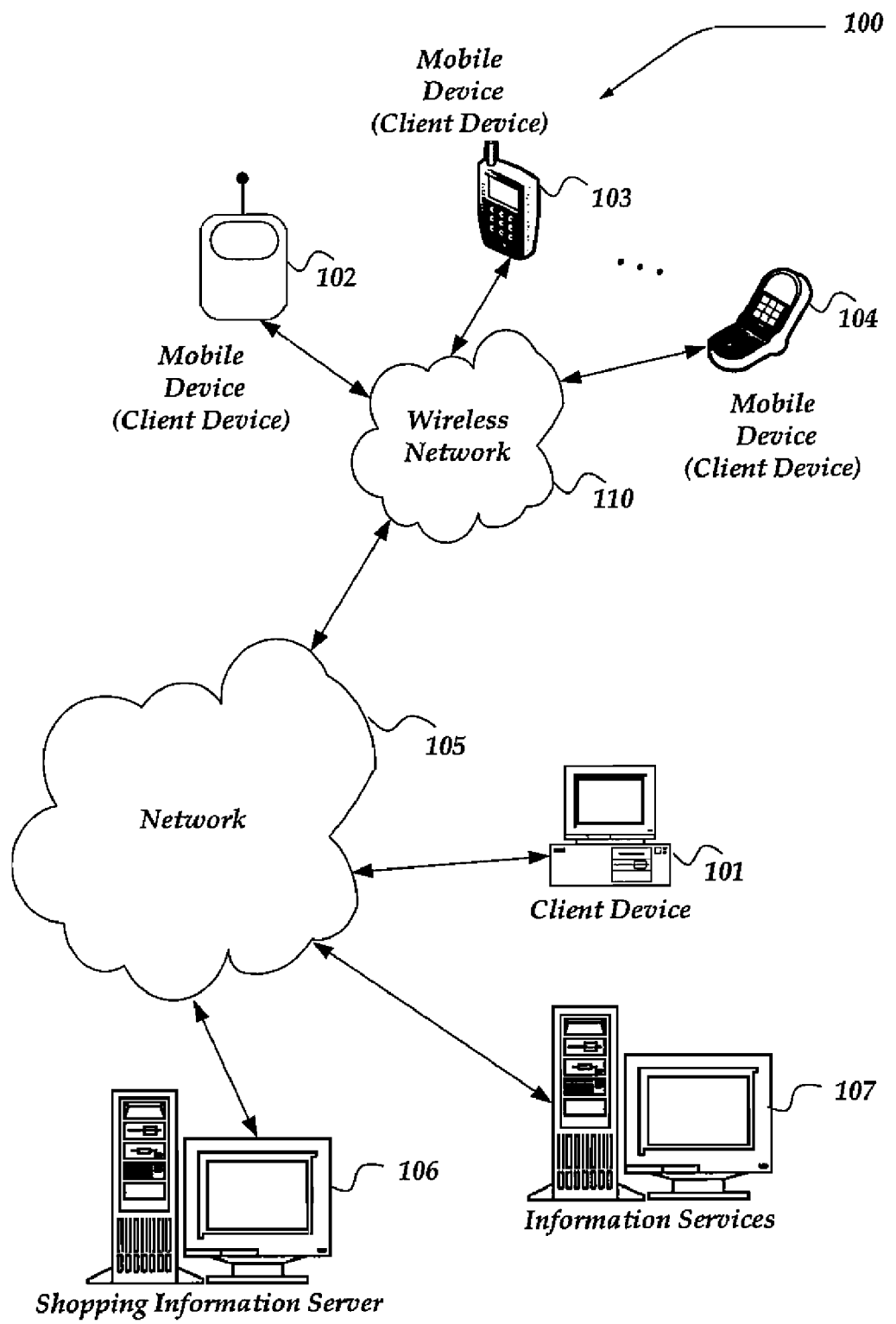
FIG. 1 shows a networked environment illustrating one embodiment of one environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." As used herein, the terms "device input" or "user input" refer to a user input command at a device.

Briefly, the present invention is directed to a device, system, and method for providing shopping information regarding an item over a network to a mobile device. The item may comprise a product, a service, or the like. A review of the item in at least one of a plurality of formats is received. A user is enabled to select at least a portion of the shopping information in one of a plurality of selectable formats based at least in part on a user input command at the mobile device. The review may is at least one selectable portion of the shopping information. A request for at least the portion of the shopping information for the item in a selected format is received from the mobile device associated with the user. Audio is at least one of the plurality of selectable formats. The requested portion of the shopping information in the selected format is provided to the mobile device, in response to the request.

More specifically, the present invention is directed to providing shopping information over a network. The shopping information may be provided from a server to a client, over a network, or the like. In one embodiment, at a server, a mapping between a key input and a shopping data is received. The mapping may be associated with a user, group of users, categories of users, or the like. An activation of the key input may be transmitted over the network from the client to the server. In response to a request, the generated audio-based shopping information may be sent from the server to the client over the network. As used herein, "audio data" or "audio-based data" refer to data for producing a human voice, alarm, tone, music, noise, or the like.

Shopping information may also include an audio advertisement. In one embodiment, the audio advertisement may be generated based on mapping user information onto a template. At a client, the audio advertisement may be received, wherein the audio advertisement provides a prompt/indication for accessing shopping information. A device input associated with the prompt may also be received at the client and/or sent to the server. Other shopping information, such as a product review or the like associated with the advertisement, may also be provided based on the device input, over the network, or the like.

A user may be enabled to control a client to receive shopping information. In one embodiment, at a client, a user may be enabled to navigate a shopping hierarchy based on the user's input, wherein the user's input comprises at least one of a Universal Product Code (UPC) entry, a spelling entry, a key input, a barcode entry, spoken entry, or the like. As used herein, "shopping hierarchy" refers to any information structure for representing items in a hierarchical manner (e.g. trees, hash tables, linked lists, or the like). "Branches" of a shopping hierarchy refers to a relationship between at least one entity and at least another in the hierarchy.

A user may also define a preference of particular types of shopping information the user wishes to receive. In one embodiment a server may provide shopping information to a client based at least on a preference indicated in a user profile or a profile associated with members of the social network to which the user belongs.

A user may be enabled to select user preferences, including a voice and/or audio data to be used in providing shopping information. In one embodiment, a server generates a user profile comprising one or more user preferences usable for generating customized audio-based shopping information to be sent over the network to a client associated with the user. The server may enable the user to select a voice from a plurality of different available voices for the audio-based shopping information. The selected voice may be included in the user profile. The plurality of voices used may be differentiated by gender, nationality, language locale (e.g., Spanish, German, Thai, Japanese), age, culture, genre, or the like.

A web and/or audio advertising mix may be provided based on a user preference. In one embodiment, a server may receive, from a user, information usable to generate audio-based shopping information that is customized for the user. The server may provide the customized audio-based shopping information over the network to a client associated with the user. The amount of audio advertisements included in the audio-based shopping information may be determined based on a subscription level of the user.

Shopping information may include audio-based reviews of a product or service. In one embodiment, a server may receive from a user, an audio-based review of a product or service. The server may generate, based on the received audio-based review, a text-based review. The server may provide shopping information over the network to a client based on the text-based review. In one embodiment, the server may generate an audio-based shopping information based on a text-based review. The audio-based review may be determined based on a location in a shopping hierarchy, demographic location which is enabled (e.g. navigated to) by the client.

As described herein, the invention may be embodied in a processor readable medium, method, system, and apparatus, or the like. As used herein, client may include any computing device in communication with a network, including a mobile device, a personal computer, an embedded device a cellular telephone, VoIP phone, land-line phone (like a payphone), personal digital assistant (PDA), notebook computer, smart phone, sidekick, blackberry, or the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes network 105 (comprising one or more local area networks ("LANs")/wide area networks ("WANs"), wireless network 110, mobile devices (client devices) 102-104, client device 101, shopping information server 106 and information services 107.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), Dynamic HTML, AJAX, CSS, eXtensible Markup Language (XML), and the like, to display and send a message.

Mobile devices 102-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Caller ID, SIM card ID, manually entered PIN, username, user ID, password, MAC address, IPv6 address, Mobile Identification Number (MIN), an electronic serial number (ESN), or other mobile device identifier. The information may also indicate a content format that the mobile device is enabled to employ. Such information may be provided in a message, or the like, sent to shopping information server 106, client device 101, or other computing devices. Moreover, mobile devices 102-104 may further provide information associated with its physical location to another computing device.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, AOL/AIM, MSN, GoogleTalk, Skype, Vonage, Email, and the like, between another computing device, such as shopping information server 106, client device 101, or the like. However, the present invention is not limited to these message protocols, and virtually any other message protocol may be employed.

Mobile devices 102-104 may be further configured to enable a user to participate in communications sessions, such as IM sessions. As such, mobile devices 102-104 may include a client application that is configured to manage various actions on behalf of the client device. For example, the client application may enable a user to interact with the browser application, email application, IM applications, SMS application, and the like.

Mobile devices 102-104 may further be configured to include a client application that enables the end-user to log into an end-user account that may be managed by another computing device, such as shopping information server 106. Such end-user account, for example, may be configured to enable the end-user to receive emails, send/receive IM messages, SMS messages, access selected web pages, participate in a social networking activity, or the like. Mobile devices 102-104 may also communicate with non-mobile client devices, such as client device 101, or the like.

Client device 101 may include virtually any computing device capable of communicating over a network to send and receive information, including social networking information, or the like. The set of such devices may include devices that typically connect using a wired or wireless communications medium such as personal computers, multiprocessor systems, microprocessor-based or programmable consumer electronics, network PCs, or the like. Moreover, client device 101, although representing a computing device that is non-mobile, may be configured to perform many of the actions described above for mobile devices 102-104. In addition, in at least one embodiment, client device 101 may also provide information, such as a MAC address, IP address GPS coordinates, latitude/longitude, IPv6 address, Unique Processor ID (such as on Intel's CPUs), or the like, useable to determine its physical location.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, EDGE, VoIP, 802.11 a/b/g, WiMax, WLAN, Wireless Router (WR) mesh networks, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple shopping information server 106 and its components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, CAT5, CAT5e, Fiber, DSL, Cable Modem, A/C power networks, POTS, Ethernet, T1, Frame Relay, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between shopping information server 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of shopping information server 106 is described in more detail below in conjunction with FIG. 3. Devices that may operate as shopping information server 106 include personal computers desktop computers, multiprocessor systems, microprocessor-based or programmable consumer electronics, network PCs, servers, and the like. Although FIG. 1 illustrates shopping information server 106 as a single computing device, the invention is not so limited. For example, one or more functions of shopping information server 106 may be distributed across one or more distinct computing devices. In one embodiment, shopping information server 106 may be configured to perform the operations described in the processes of FIGS. 4-7 and/or use table 800 of FIG. 8.

Information services 107 represents a variety of services devices that may provide additional information for use in generating reviews or other user information for use in the invention. Such services may include, but are not limited to web services, third-party services, and the like. Devices that may operate as information services 107 include personal computers desktop computers, multiprocessor systems, microprocessor-based or programmable consumer electronics, network PCs, servers, and the like. For example, information services 107 may be an independent social networking system that stores preferences, reviews and other information for a group of users. The information services 107 may be accessible by the shopping information server 106 through an application programming interface (API), or the like. Thus, shopping information server 106 may be configured to receive social networking information, reviews and/or other suitable third party information from the information services 107 for providing shopping information across a network, as described herein.

Illustrative Mobile Client Environment

Figure 2:
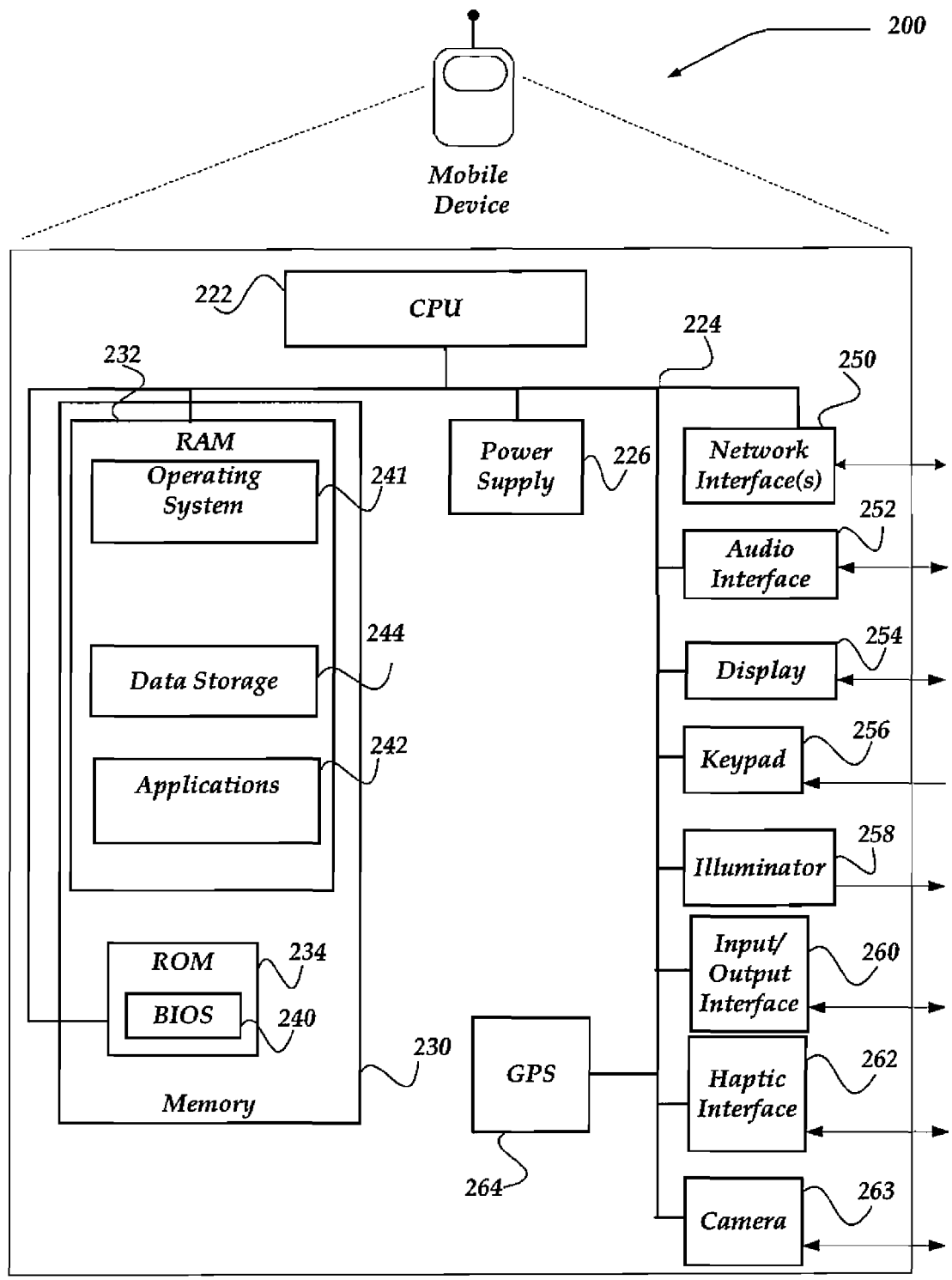
FIG. 2 shows one embodiment of a mobile device that may be included in a system implementing the invention.

FIG. 2 shows one embodiment of mobile device 200 that may be included in a system implementing at least one embodiment of the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and camera 263. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice, alarms, tones, music, noise, or the like. For example, audio interface 252 may be coupled to a speaker and microphone (not shown) to enable telecommunication with others and/or generate an audio acknowledgement for some action. Display 254 may be a liquid crystal display (LCD), Vacuum Florescent Display (VFD) gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Camera 263 is arranged to provide a still or moving image to the user and/or to send or receive such image over network interface 250. In one embodiment, camera 263 may be a charged-coupled-device (CCD) digital camera, or the like.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS, SIRF, or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device 200 may, through other components, provide other information that might be employed to determine a physical location of the device, including for example, a MAC address, IP address, Cellular Tower, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, including embedded LINUX™, or a specialized client communication operating system such as Windows Mobile™, Palm OS or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, browsers including Web browsers, RSS feed readers, contact manager, photo viewer, video replay and recorder, audio playback and recording (such as MP3), camera, email clients, IM applications, SMS applications, VOIP applications, contact managers, task managers, transcoders, database programs, word processing programs, security applications, spreadsheet programs, games, search programs, and so forth.

Mobile device 200 can be configured to participate in the methods discussed herein, by receiving information from the network 105 of FIG. 1 via wireless network 110 and/or network interface 250, or the like. The received information may be audio-based, in which case it can be output via audio interface 252. Alternatively, the information may be text-based, in which case it can be displayed using display 254. The mobile device 200 may be configured to permit a user to communicate, with the shopping information server 106 via the network 105, or the like. For example, the user may navigate a shopping hierarchy stored on the shopping information server 106 using audio commands, key commands entered on keypad 256, or the like. In one embodiment, mobile device 200 may send location information from GPS transceiver 264 over network interface 250 to a shopping information server, or the like.

The mobile device may include further applications (not shown), stored in the RAM 232 or ROM 234, or the like, that may permit the user to interact with the shopping information server 106 in a way similar to the client computer 101, (e.g., to enter user preferences or the like).

In one embodiment, the mobile device may be configured to capture an image of a UPC code and/or a barcode with camera 263, or the like and to send the image to shopping information server 106, over network interface, for further processing. In one embodiment, the mobile device may include optical recognition software (not shown) stored in the RAM 232 or ROM 234, or the like, configured to transcode an image into shopping related information (e.g. a product code, price, location, product name). In one embodiment, optical recognition software may include a proprietary program developed for the JAVA platform, Palm OS, Windows CE, Linux, or the like In one embodiment, the mobile device may be configured to send audio data through audio interface 252 to shopping information server 106, over network interface, for further processing.

Illustrative Server Environment

Figure 3:
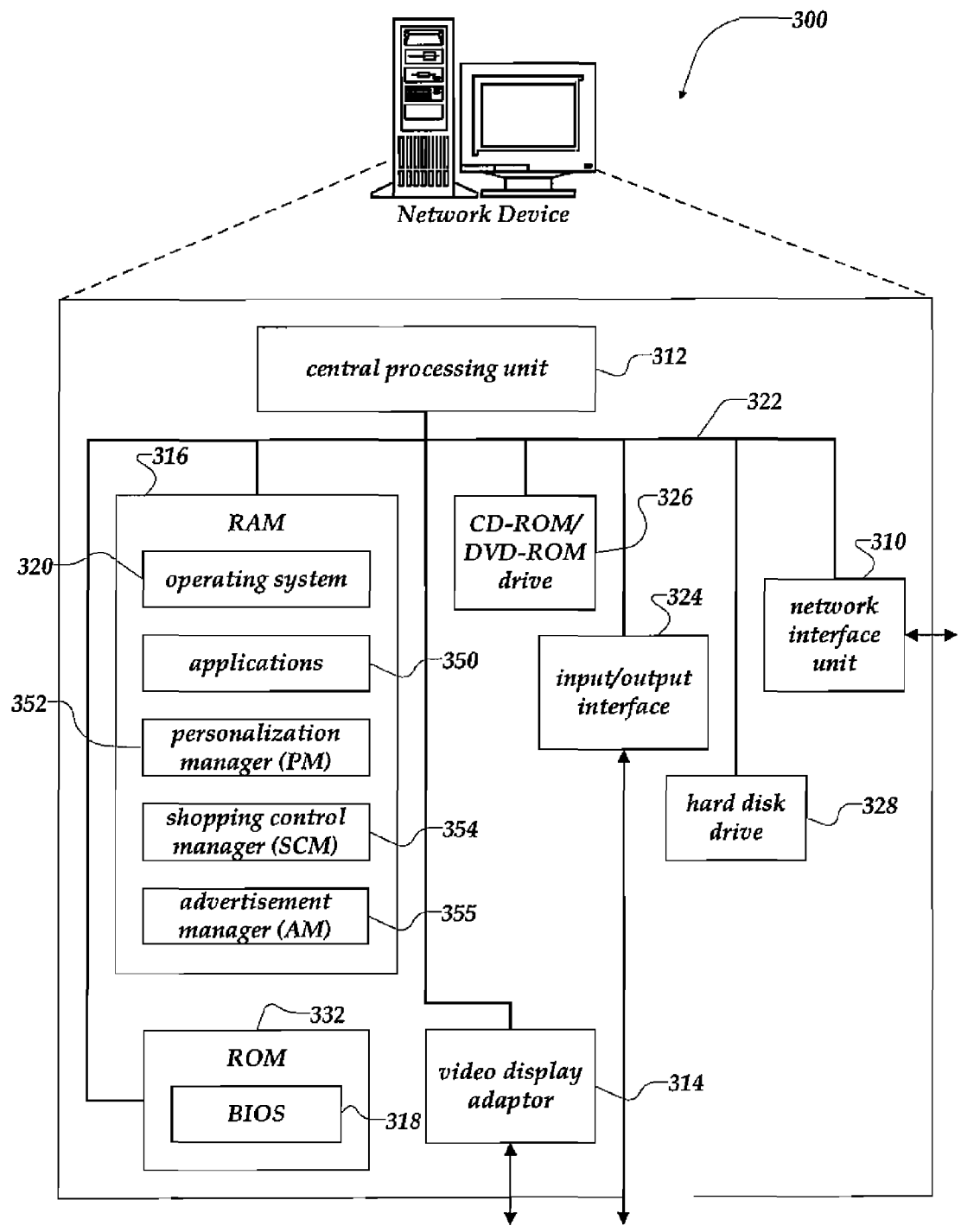
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, shopping information server 106 of FIG. 1.

Network device 300 includes central processing unit 312, video display adapter 314, and a mass memory, all in communication with each other via bus 322. The mass memory generally includes RAM 316, ROM 332, and one or more permanent mass storage devices, such as hard disk drive 328, tape drive, CD-ROM/DVD-ROM drive 326, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, Digital Video Disc (DVD) or other optical storage, holographic, nanotube, atomic, biological, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Personalization Manager (PM) 352, Shopping Control Manager (SCM) 354 and Advertising Manager (AM) 355 may also be included as one or more application programs within applications 350.

PM 352 may control operation of the process described with reference to FIG. 7 below. The network device 300 may be configured to receive, from device such as a client computer 101 of FIG. 1, or mobile device 102-104 or directly via input/output interface 324, a mapping for a key sequence via the network interface unit 310. The mapping may be stored in hard disk drive 328, such that if the key sequence is communicated from a mobile device 102-104 to the network device 300, the PM 352 is configured to look up in the hard disk the mapping associated with that key sequence and return associated shopping information via network interface unit 310. The associated shopping information may also be stored on the hard disk drive, or it may be accessed from, for example, information services 107 via network interface unit 310.

SCM 354 may control operation of the processes described with reference to FIGS. 4 and 6 below. Thus, the SCM 354 may control the retrieval or receipt of review information over the network using network interface unit 310, from, for example, a device such as mobile devices 102-104 of FIG. 1, client computer 101 or information services 107. The retrieved or received review information can be stored, for example, in hard disk drive 328. The stored information can be voice-to-text/text-to-voice translated using central processing unit 312 and/or a translation and voice message processing system such as a software implementation of a telephone private branch exchange (PBX), or the like. In one embodiment, SCM 354 may receive image data which may be transcoded to shopping information by a optical recognition program or the like. Such transcoded shopping information may be associated with a product review, or the like. The translated or the stored information may be provided to a mobile device via the network interface unit 310 if a request for that information is received. The information may also be displayed using video display adaptor 314.

A shopping hierarchy may be included as a database, file, spreadsheet, or virtually any data store that is stored in hard disk drive 328, or the like. The shopping hierarchy may be a hierarchical structure, represented by a linked list, tree, XML data, SQL records, or the like. The SCM 354 may control the navigation of the shopping hierarchy based on commands, received from a mobile device, over a network at network interface unit 310, or the like. The SCM 354 may be arranged to receive geographical information about the mobile devices, such as mobile devices 102-104, from GPS unit 264 of FIG. 2, or the like. Further, in one embodiment, the SCM 354 may receive from a third-party, via a network interface unit 310, shopping information associated with branches of the shopping hierarchy, or the like. In one alternate embodiment, the shopping information may be stored in the network device itself, (e.g., in the hard disk drive, or the like).

AM 355 may control operation of the process described with reference to FIG. 7 below. Personalization information may be included in a database, file, spreadsheet, or virtually any data store that is stored in hard disk drive 328, or the like. The AM 355 may be adapted to extract information from the data store and map the information on to a template, which may also be stored on the hard disk drive 328 or may be communicated to the network device 300 via the network interface unit 310, or the like. Personalization information may also be received from outside the network device 300, via the network interface unit 310 (from client computer 101 or information services 107) or via input/output interface 324, which may be connected to a keyboard, mouse, other user input device, or the like. In one embodiment, after mapping the personalization information into the template, the AM 355 may be arranged to translate the result into an audio advertisement to by sent over the network via network interface unit 310, or the like.

Illustrative Operation

Figure 4:
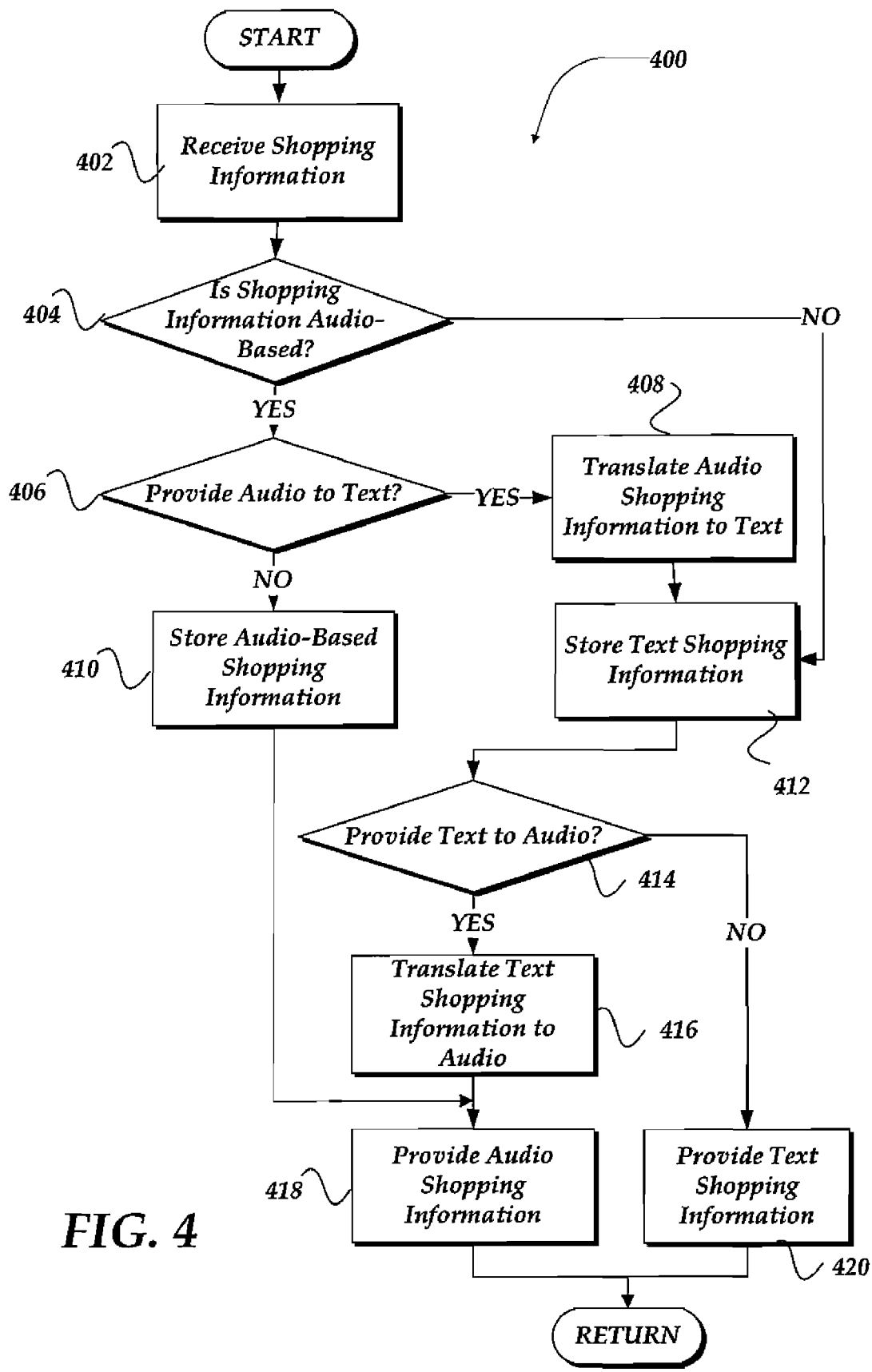
FIG. 4 illustrates a logical flow diagram generally showing one embodiment of a process for gathering and/or processing review information.

FIG. 4 illustrates a logical flow diagram generally showing one embodiment of a process for gathering and/or processing review information. The process shown in FIG. 4 may be implemented with shopping information server 106 of FIG. 1.

Process 400 begins, after a start block, at block 402, where a shopping information is received. In one embodiment, the shopping information may include store directions from one location to another. In one embodiment, shopping information may include a consumer's review for a product or service (collectively referred to as "a product" or "an item"). In this embodiment, the shopping information may be received form the user. The review may rate the product itself, (e.g., in terms of usefulness, value for money, fulfillment of expectations or the like). In one embodiment, the review may relate to the purchasing experience, may take note of special offers, or the like. In one embodiment, the shopping information may include a summary of at least a portion of the review.

The shopping information may take any of a variety of formats. The shopping information may be audio-based, (e.g., recorded at a user's computer or mobile device, or the like). In one embodiment, the received shopping information may be video-based. In one embodiment, an audio portion of the video-based shopping information may be extracted and further processed as described herein. Alternatively, the shopping information may be text-based and/or entered at a client device or on a mobile device, or the like. The shopping information may be received via Web HTTP HyperText Transport Protocol, XML, email, SMS, VOIP or the like. In one embodiment, the shopping information may be received substantially in real time, (e.g., at or around the point of purchase). Processing next flows to decision block 404.

At decision block 404, it is determined whether the shopping information is audio-based. If the shopping information is audio-based, then the process flows to block 406 where it is determined whether to provide a text-based shopping information based on the audio-based shopping information. The process may be configured to provide text-based shopping information (e.g. a summary) for all received audio-based shopping information. Alternatively, the process may provide text-based shopping information for only some audio-based shopping information, for example, based on any one or more of user context information (e.g. user identify or preferences), time of shopping information receipt, product information, review duration.

If at block 406 it is determined that a text-based shopping information is to be provided, the process flows to block 408, where the audio-based shopping information is translated into a text-based shopping information. Translation may be performed manually, (e.g., by audio typing), or automatically using voice recognition software or the like. The process then flows to block 412, where the text-based shopping information is stored.

If at block 406 it is determined that text-based shopping information is not to be provided based on the audio-based shopping information, the process flows to block 410, where the audio-based shopping information is stored. The stored shopping information may be identical to the received shopping information or may be edited. From block 410, the process flows to block 418, where the stored audio-based shopping information is provided to a user's mobile device over a network, or the like. The process may then return to a calling process, for further processing.

If at block 404 it is determined that the shopping information is not audio-based shopping information, the process flows to block 412, where a text-based shopping information based on the received shopping information may be stored. The text-based shopping information may be identical to the received shopping information. Alternatively, formatting or editorial changes may be made.

From block 412, the process flows to block 414, where it is determined whether to provide audio-based shopping information based on a text-based shopping information. For example, audio-based shopping information may be based on a received text-based shopping information or on a stored text-based shopping information translated from a received audio-based shopping information. The audio-based shopping information may use a computer generated voice; thus, in one embodiment, the process may receive a live voice providing the shopping information, translate the audio-based shopping information into text shopping information for storage, or the like, and provide a computer generated voice if a user requests the shopping information as a voice from a mobile device.

If at block 414 it is determined that an audio-based shopping information is to be provided, the process flows to block 416, where the stored text-based shopping information is translated into audio-based shopping information. In one embodiment, the translated audio-based shopping information may be pre-generated, generated on the fly, cached, or the like. In one embodiment, the cached audio-based shopping information may be stored for a particular period of time (e.g. daily, weekly, monthly), based on an age of the shopping information, a frequency of use of the shopping information, or other system requirements (e.g. disk drive, bandwidth, memory usage). If audio-based shopping information is not cached, then the audio-based shopping information may be generated on the fly and/or re-cached, or the like. The process may then flow to block 418, where audio-based shopping information is provided to a user's mobile device over a network, or the like. The process may then return to other processing.

If at block 414 it is determined that an audio-based shopping information is not to be provided (e.g., if the request is from a web browser configured to display graphical shopping information), the process may then flow to block 420, where the stored text-based shopping information is provided to a user's mobile device or computer over the network, or the like. The stored text-based shopping information may be sent via SMS text messaging, or the like. The process may then return to other processing.

In one embodiment (not shown), a user preference my specify that both a audio and a text-based shopping information should be provided to the user. In this embodiment, blocks 418 and 420 are both performed.

In an alternate embodiment (not shown), the text-based and/or audio-based shopping information may be summarized before being provided to the user, utilizing natural language processing, computational linguistic methods, digesters, automated summarizers, or the like. This summarization may occur at block 404. In another embodiment, audio-based shopping information may be translated to text, summarized, stored and/or translated back to audio before being provided to the user. In some embodiments, the portion of the shopping information to summarize may be based on user behaviors, preferences, heuristics, or the like. In one embodiment, the shopping information may be sent to a third-party for translation, before being provided to the user.

Figure 5:
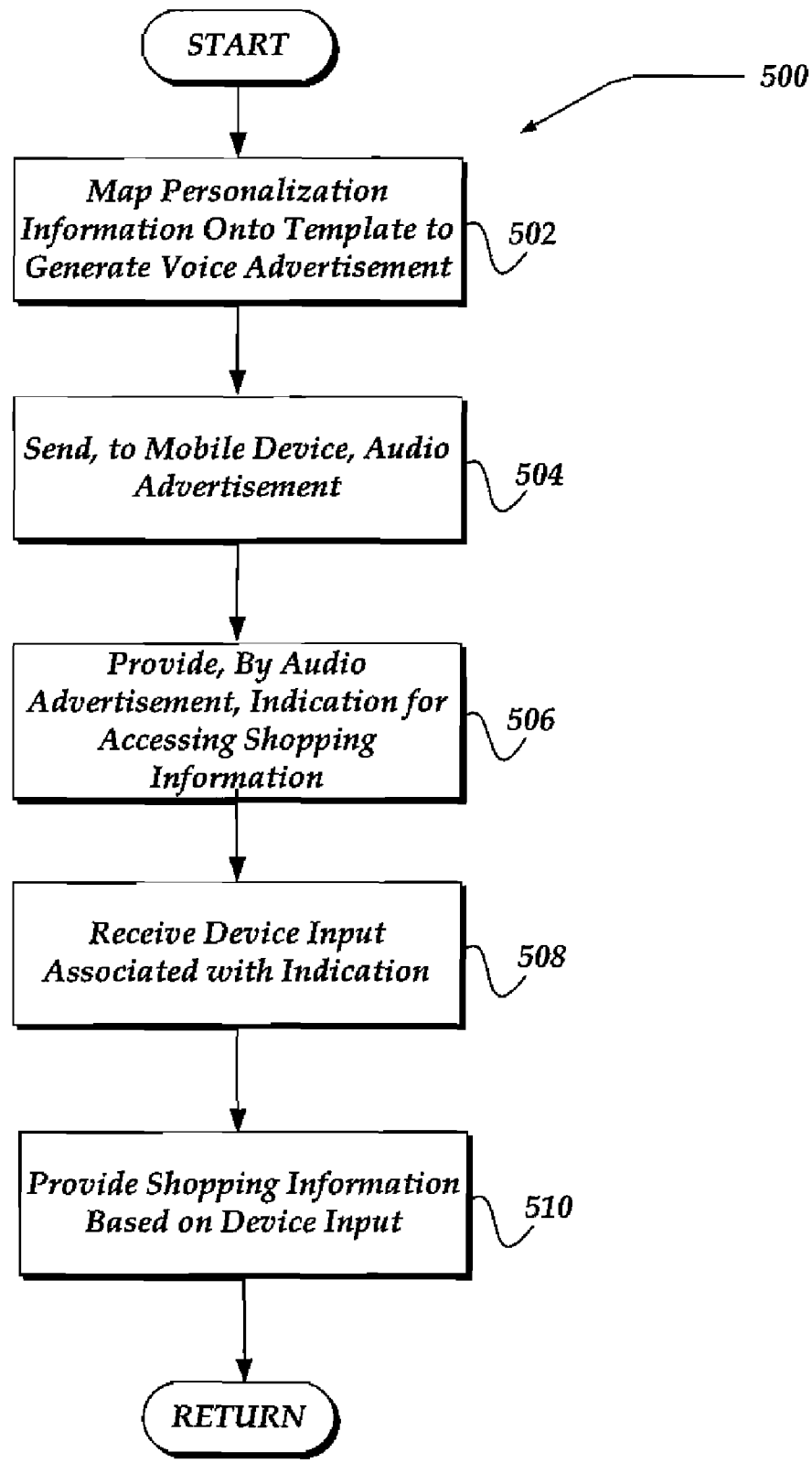
FIG. 5 illustrates a logical flow diagram generally showing one embodiment of a process for receiving shopping information at a mobile device.

FIG. 5 illustrates a logical flow diagram generally showing one embodiment of a process for receiving shopping information at a mobile device. Process 500 of FIG. 5 may, for example, be implemented using any one or more of the mobile devices 102-104 of FIG. 1, and/or in combination with the shopping information server 106, or the like. It is important to note, that while directed towards mobile devices, the invention is not so limited, and a 'stationary' computing device, such as client device 101 may also employ process 500, without departing from the scope or spirit of the invention.

Process 500 begins, after a start block, at block 502, where personalization information relating to a user is mapped on to a template to generate an audio-based advertisement. In one embodiment, the personalization information may be stored in a database that is part of or accessible by a shopping information server, such as shopping information server 106 of FIG. 1. The template may be audio-based and/or text-based. If template is text-based, the template may include data fields on to which the personalization information may be mapped such as the user's first name, last name, username, city, state, or the like. In one embodiment, the template may selected for a mapping based on a user's behaviors, such as current and/or previous categories or products the user has searched. Thus, the information provided to the user is configured to be interesting and relevant to the user.

The mapping process may include locating and reading entries from a data structure, (e.g., table, or the like). In one embodiment, the mapping process may be initiated in response to the establishment of a connection between a user device and the personalization server. In one embodiment, the mapping step may be triggered by some other event, such as the elapsing of a certain (e.g. predetermined) time period.

In an alternate embodiment (not shown), at block 502, the audio advertisement may not be mapped. Instead, the audio advertisement may be a pre-generated audio advertisement, or the like. In one embodiment, block 502, may determine to map the personalization information onto a template to generate the audio advertisement based at least on a user preference and/or subscription level. If the user information indicates otherwise, then a pre-generated audio advertisement is provided. If a subscription level indicates no advertisement are presented, processing then continues to block 510.

The process may then flow to block 504, where the audio advertisement is sent to a mobile device associated with the user. The audio advertisement may be heard by the user on the mobile device. The process may therefore flow to block 506, where the audio advertisement provides to the user a prompt, and/or another indication for accessing shopping information. For example, the prompt may represent a telephone number or SMS short code number from which shopping information can be retrieved. Alternatively, the prompt may invite entry of a key input, (e.g. "press the * key now for further information"; a simple voice action such as the user saying the word "more info") to permit the user to retrieve shopping information directly from the audio advertisement. In one embodiment, the prompt may be a web or email address accessible over the network from either a mobile device or a client computer. In another embodiment, the prompt may provide more audio and/or in-depth detail about that product. the prompt may also take the user to reviews of the product, or the like. In one embodiment (not shown), the user may not be provided a prompt at block 506 or may be provided a prompt at the end of the audio advertisement. Thus, the user may be disabled from skipping the advertisement.

The process may then flow to block 508, where a device input associated with the prompt is received. In one embodiment, the device input is received at a shopping information server. The device input may be from the user's mobile device or from a client computer, or the like. Processing next flows to block 510, where shopping information is provided based on the received device input. In this embodiment, the shopping information server may include a data structure in which shopping information is associated with various device inputs. Based at least on a users voice command (e.g., "up", "down", "yes", "no", "next", "price", "find", "search"), a, received device input (e.g. keystroke; a combination of keys or sequences of keys such as "*", telephone number, SMS/email message content or the like), the shopping information server 106** may access the associated shopping information and provide the associated shopping information as an output to the device from which the input was received. Other factors may be taken into account in the provision of the shopping information, such as user preferences, user location, type of device or the like. After the shopping information is provided, the process may return to other processing.

In an alternate embodiment, at block 508, a subscription level associated with the user may indicate that an automated response is to be provided to the user. In this case, the shopping information may be generated or otherwise provided to the user as described above. However, if at block 508, the subscription level indicates that a live operator is to provide the shopping information, the generated shopping information may not be provided. Instead, a live operator may be connected directly to the mobile device to provide the shopping information.

Figure 6:
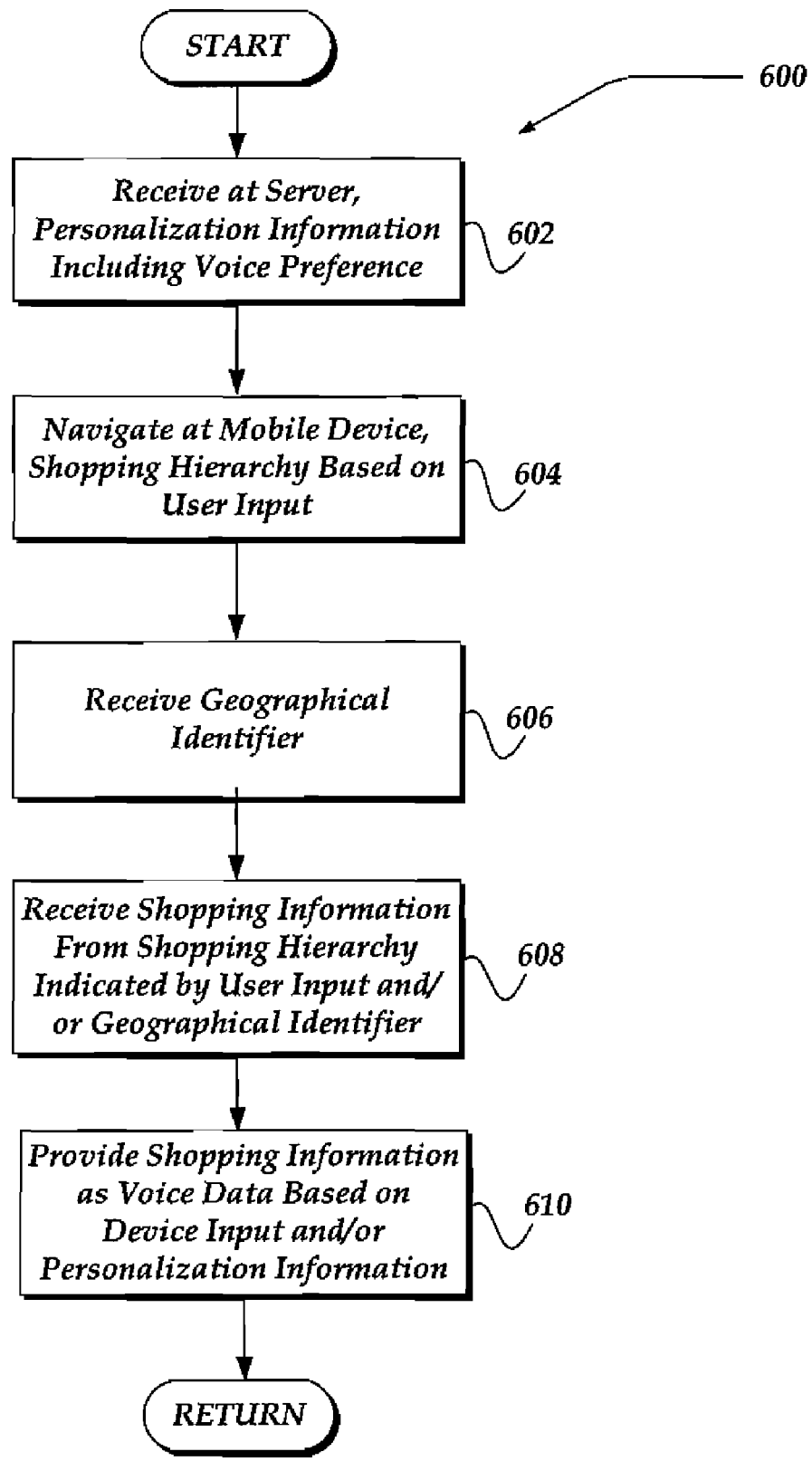
FIG. 6 illustrates a logical flow diagram generally showing one embodiment of a process for receiving shopping information at a mobile device.

FIG. 6 illustrates a logical flow diagram generally showing one embodiment of a process for receiving shopping information at a mobile device. Process 600 of FIG. 6 may, for example, be implemented using any one or more of the mobile devices 102-104 of FIG. 1, and/or in combination with the shopping information server. It is important to note, that while directed towards mobile devices, the invention is not so limited, and a 'stationary' computing device, such as client device 101 of FIG. 1 may also employ process 600, without departing from the scope or spirit of the invention.

Process 600 begins, after a start block, at block 602, where a shopping information server receives, from a device, such as client computer 101 of FIG. 1 or mobile device 102-104, or the like, personalization information associated with a user. The personalization information includes a voice preference. The voice preference may indicate the type of voice in which a user wishes to hear shopping information and/or audio advertisements. In one embodiment, the type of voice may be indicated by a style, gender, speed, tone, inflection, language, dialect, or the like. The voice preference may include one or more options. For example, different voices may be preferred for difference types of audio-based information. The voice preference may indicate a computer generated voice or a real voice, and may match with a celebrity's voice or other personality's voice (e.g. a relative or friend of the user), or the like. The personalization information may include one or more further user preferences. In one embodiment, the preferences may include indicating that the user should be provided ratings, reviews, summaries, in combination, together, alone, or the like. In one embodiment, the preferences may indicate providing the user the best and worst, suggest other items like current review, or the like. The user preferences may be included in a user profile, stored to be accessible by the shopping information server 106, or the like.

Processing next flows to block 604, where a user can navigate a shopping hierarchy based on inputs to a mobile device. The shopping hierarchy may include entries for products in a tree-like genre-type-product arrangement, in which a user can navigate up and down the tree branches using commands at the mobile device. The commands may correspond to spoken voice instructions or one or more keystrokes. Shopping information may be associated with nodes in the hierarchy. A user may choose to receive the shopping information (e.g. in text-based or audio-based form) by entering a command. Alternatively, the shopping information may be provided automatically if a user navigates to a particular node.

Processing next flows to block 606, where a geographical identifier is received. The geographical identifier may be associated with the user (e.g. home address or zip code), a location entered by the user (e.g., by entering in a new ZIP code), or mobile device (e.g. actual position determined by GPS or the like). At block 608, shopping information associated with the shopping hierarchy is retrieved based on the user input and/or the geographical identifier. The shopping information available at a given node may be variable depending on the geographical identifier. The shopping information may be text-based.

Processing then flows to block 610, where the retrieved shopping information is provided to the user, at the mobile device or client computer as audio-based data, or the like. The format of the audio-based data (e.g. the type of voice used) may be determined based on the personalization information stored for the user. In one embodiment, the user's preferences may indicate that particular shopping information be retrieved—e.g. the address and phone of the stores, closest store with item in stock, directions SMS, directions read, or the like. After the shopping information is provided, the process may return to other processing.

Figure 7:
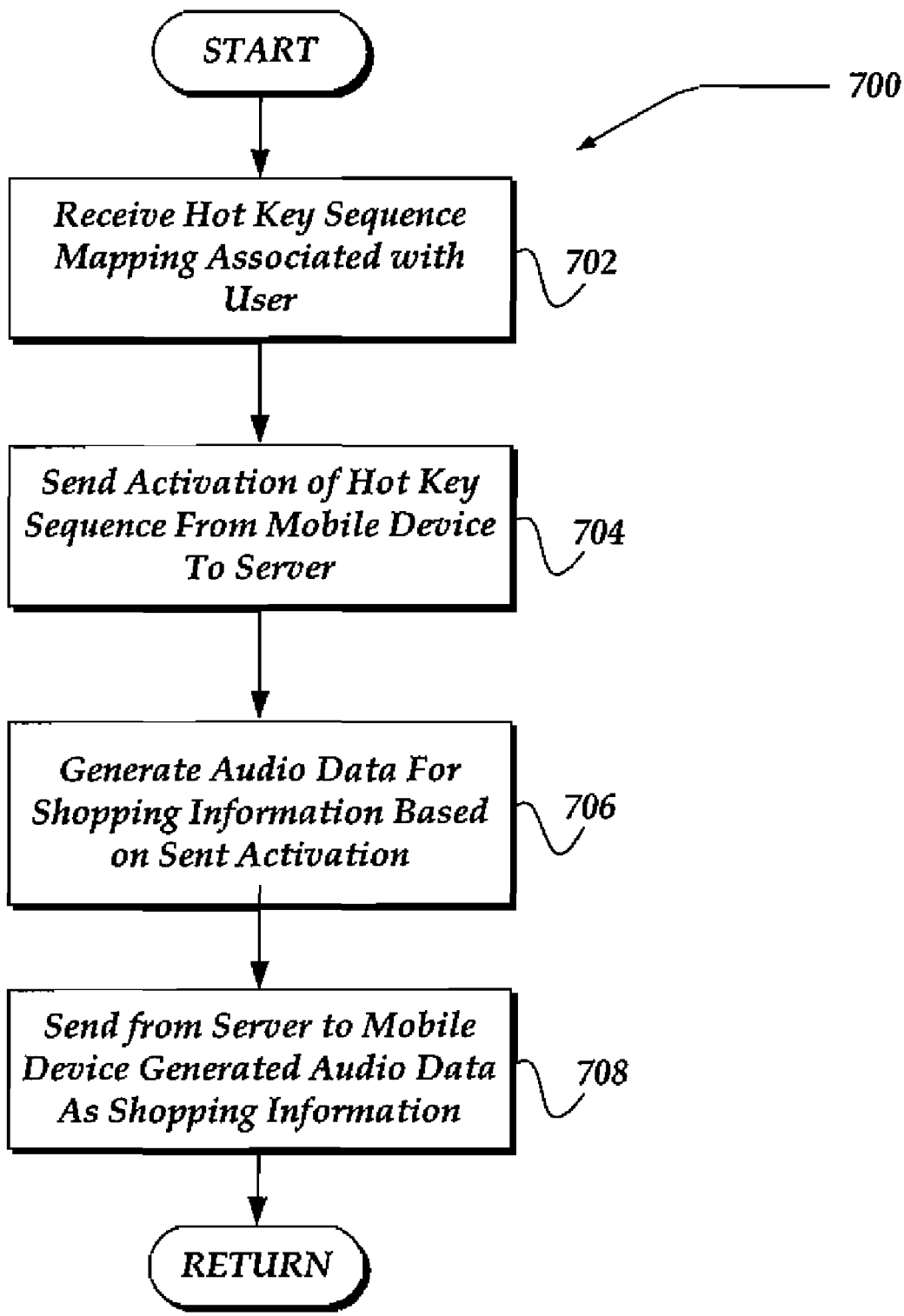
FIG. 7 illustrates a logical flow diagram generally showing one embodiment of a process for receiving shopping information at a mobile device.

FIG. 7 illustrates a logical flow diagram generally showing one embodiment of a process for receiving shopping information at a mobile device. Process 700 of FIG. 7 may, for example, be implemented using any one or more of the mobile devices 102-104 of FIG. 1, and/or in combination with the shopping information server 106. It is important to note, that while directed towards mobile devices, the invention is not so limited, and a 'stationary' computing device, such as client device 101 may also employ process 700, without departing from the scope or spirit of the invention.

Process 700 begins, after a start block, at block 702, where a mapping between a key input on a mobile device and selected shopping information is received at a shopping information server, or the like. In one embodiment, a user may create the mapping relationship at a device, such as client computer 101 of FIG. 1, and upload the mapping relationship to the shopping information server. The mapping relationship may link the key input with one or more products from a product set. The product may be associated with up-to-date shopping information, including recent reviews or the like. The key input may be a sequence of device inputs (e.g. keystrokes) or other suitable command functions (e.g. spoken voice commands).

Processing next flows to block 704, where a key input is activated at a mobile device and the activation is communicated over the network to the shopping information server 106. At block 706, the process generates audio-based data for shopping information based on the communicated activation. For example, the server may locate text-based shopping information based on the mapping uploaded by a user and then translate the located text-based shopping information into audio-based data. Processing next flows to block 708, where the generated audio-based data is sent as shopping information to the mobile device over the network. After the shopping information is provided, the process may return to other processing.

It will be understood that each block of the flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Control Structure

FIG. 8 shows a table 800 which may be used to determine the type of advertising to provide a customer based on a subscription level chosen by a customer. As shown, row 802 indicates an amount of web and audio advertising associated with different user subscription levels. Row 804 shows that where the subscription is free, a user accessing the shopping information system on a mobile device or on a client computer (e.g. using a web browser) will receive a full amount of web and/or audio advertising. Rows 806 and 808 shows that if at least an indication of a payment, or the payment is made for a medium subscription, a user may receive fewer web and/or audio advertisements. The amount and mixture between web and/or audio advertisements may be variable depending on the amount of the subscription, based on historical data for the user's preferences and/or behaviors, the user's social network preferences and/or behaviors, or the like. For example, a user may choose the relative proportion of web advertisements to audio advertisements. Alternatively, this proportion may be determined automatically, based on the user's usage of the system, or the like. Row 810 shows that if the user chooses a full subscription, the user may receive no or substantially no advertisements.

Illustrative User Interface

Figure 9:
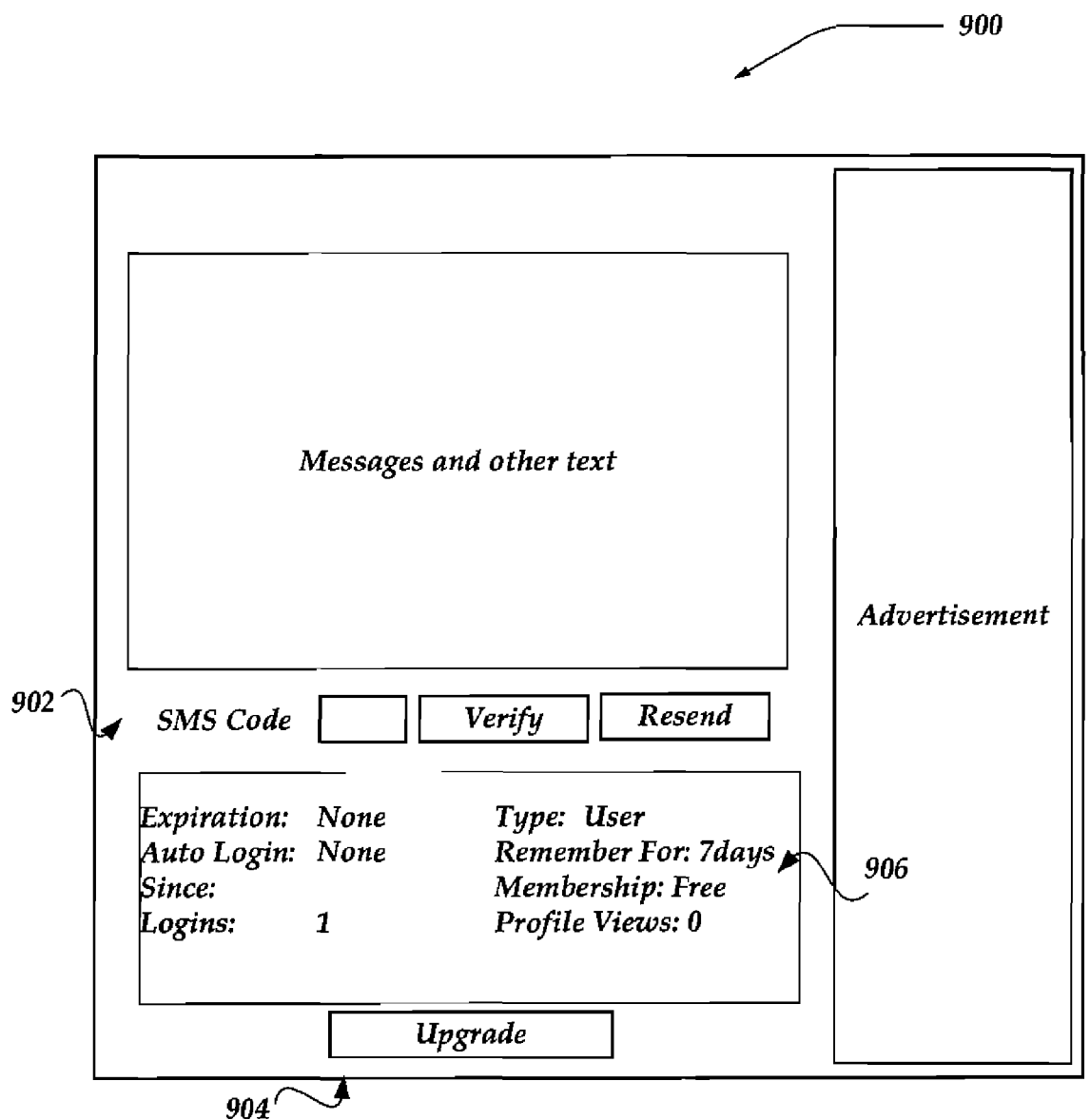
FIG. 9 shows one embodiment of a graphical user interface (GUI), which can be used in an embodiment of the invention.

FIG. 9 shows one embodiment of a graphical user interface (GUI), which can be used in an embodiment of the invention. The GUI includes verification data field 902 for receiving a code sent to a user's mobile device in response to a user registering that mobile device with the server. The GUI also includes drop down menu 904 for selecting a subscription level, as indicated in label 906, and a button for upgrading to a higher subscription if wanted. The GUI includes space for one or more web advertisements.

Figure 10:
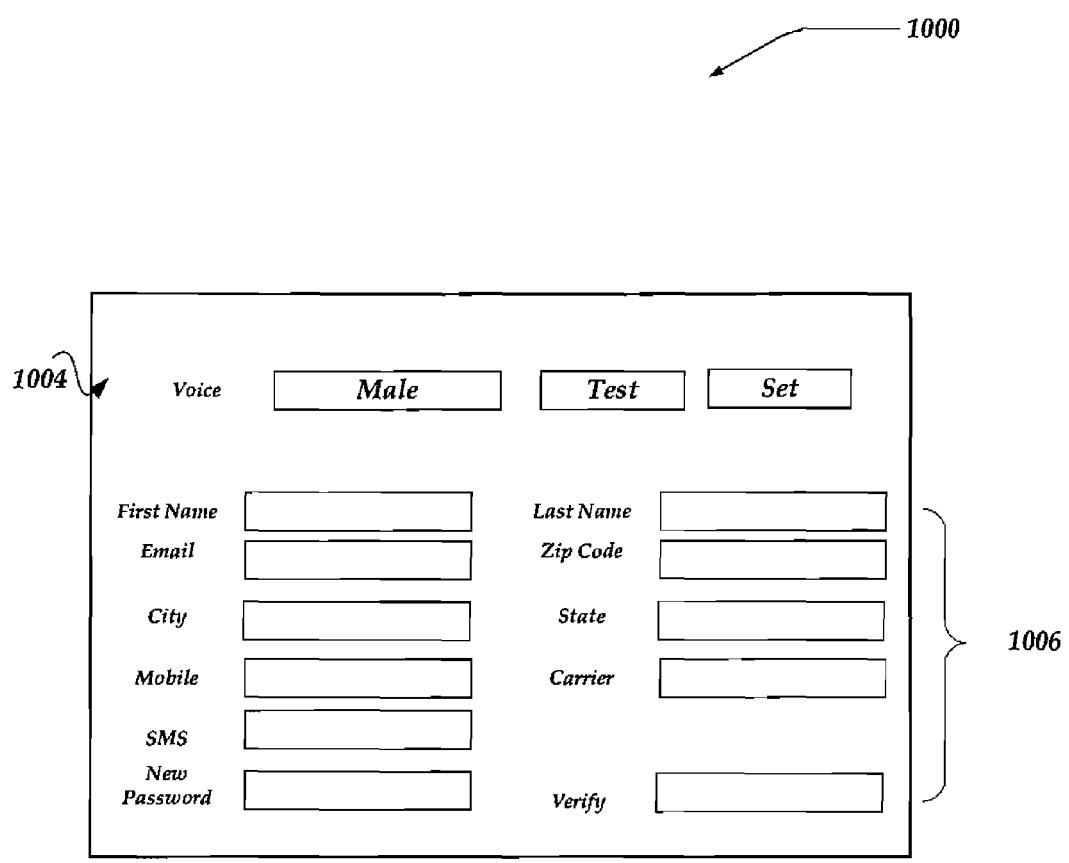
FIG. 10 is a screen shot of user login page from a graphical user interface that may be user in an embodiment of the invention.

FIG. 10 shows one embodiment of a graphical user interface (GUI) having data fields for receiving data to define a user profile. The GUI includes drop down menu 1004 for selecting a preferred voice type. The GUI also includes user information input 1006.

Figure 11:
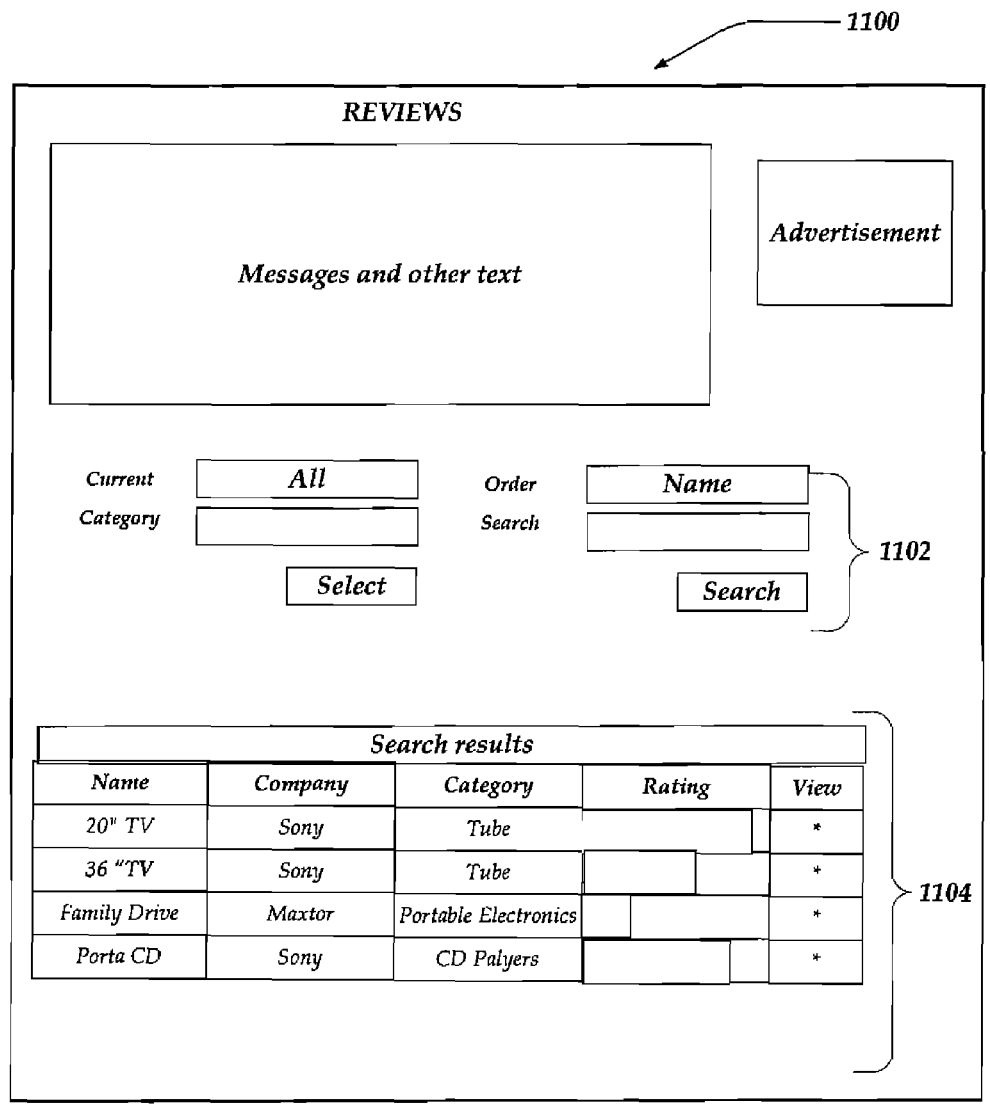
FIG. 11 shows one embodiment of a graphical user interface (GUI), which lists one example of shopping information in the form of product review ratings, in accordance with the present invention.

FIG. 11 shows one embodiment of a graphical user interface (GUI), which lists one example of shopping information in the form of product review ratings. Drop down menus 1102 for selecting a product category is provided for navigating through a hierarchy of shopping information. The product category may also be displayed as hyperlinks, in a tree view, or the like. A keyword data field is also provided for searching the hierarchy. Drop down menus 1102 also provided for selecting a display order for the reviews (e.g. the column headings are clickable). Review panel 1104 shows examples of reviews of selected products. The GUI may also include a free-form search field which intelligently searches various database fields such as make, model, brand, UPC, category, color, size, price, of a product or service, or the like.

Illustrative Alternate Embodiments

One embodiment of the present invention may be directed to a system, method, and apparatus for providing shopping information over a network, comprising receiving, at a server, a mapping between a key input and shopping data, wherein the mapping is associated with a user; transmitting an activation of the key input over the network from a mobile device to the server; generating, in response to the transmitted activation, audio-based shopping information based on the shopping data; sending the generated audio-based shopping information from the server to the mobile device over the network. The key input may be user designated. The key input may be a hot-key input. The key input may be a single keystroke, a combination, sequence of keystrokes, or the like. Alternatively, the key input may be a spoken voice or otherwise selected command. Receiving the mapping between a key input and the shopping data may comprise at least one of receiving the key input from an auction by a plurality of third parties, receiving the key input based on another key input associated with a social network to which the user belongs, or receiving the key input from the user.

The audio-based shopping information may be a voicemail message or the like sent to the mobile device. The information may be a pre-recorded spoken voice message or a computer generated voice message (e.g., transformed from text), or the like. Thus, the user may be able to access or receive shopping information at a mobile device based on input of a key stroke or sequence.

Another embodiment may be directed to providing shopping information, comprising: generating an audio advertisement based on mapping user information onto a template; receiving, at a mobile device, the audio advertisement, wherein the audio advertisement provides an indication/prompt for accessing shopping information; receiving a device input associated with the indication; and providing the shopping information based on the device input. The user information may include at least one of user profile information, behavior information, or social networking information, or the like. The template may be text-based. Similarly, the user information may be text-based, stored in a database for retrieval, or the like. The indication for accessing shopping information may be a key input for entering on the mobile device. In one embodiment, the indication may include instructions for receiving the shopping information directly by contacting a vendor by telephone, fax, email, SMS or the like.

The audio advertisement may be aurally distinguishable from the shopping information, to enable a user to know if he is listening to an advertisement or to requested information, or the like. The audio advertisement may be delimited from the shopping information by a signature sound such as a beep, buzz, jingle, spoken voice message, or the like. In one embodiment, the audio advertisement may be given in a different voice from the shopping information. For example, if a user usually receives shopping information in a male voice, a female voice may be used for advertisements. In one embodiment, the voice may be specially reserved to distinguish voice advertisements, or the like.

In this embodiment, generating the audio advertisement may comprise: determining the template based on context information associated with the user; determining a rule set for mapping information onto the template; applying the rule set to map the user information onto the template to generate an advertising data structure; and converting the advertising data structure to the audio advertisement. Thus, as indicated above, the template may be text-based, and/or selected based on context information associated with the user from a database of one or more templates (e.g., having one or more fields such as the user's first, last or username, city, state, products they own, etc.), or the like. The template may include one or more fields into which user information is mappable. The rule set for performing a mapping operation may be determined based on factors such as day and/or time of advertisement or other context information associated with the user. The advertising data structure may be text-based, suitable for converting into audio-based data.

Another embodiment may be directed to providing shopping information over a network, comprising navigating, at a mobile device, a shopping hierarchy based on a user input, wherein the user input comprises at least one of a Universal Product Code (UPC) entry, a spelling entry, a key input, or a barcode entry. In one embodiment, the spelling entry may be based upon the a configuration of a telephone keypad (e.g., T9, QWERTY) and/or an intelligence (e.g. on the client or server side) for mapping a key sequence entry with a search query and/or result. Such intelligence may use predictive key mapping, or the like. In one embodiment, navigating may comprise receiving a special key sequence (such as "****")

which enables the user to bypass the navigation of the shopping hierarchy and/or enable the user to jump to a particular product, category, or the like. The method may further include receiving, over the network, shopping information which is included in the shopping hierarchy, if the shopping information is requested by the user input. Shopping information may be requested by issuing a further command, (e.g., a spoken voice command, key input or the like). The method may include generating the shopping information as audio data. For example, the shopping information may be generated by mapping product information onto a template, based at least on a user information. The steps explained above in relation to the other embodiments, described herein, may apply to this embodiment as well.

In this embodiment, the method may include providing a geographical identifier, wherein the shopping information is provided based on the user input and the geographical identifier such that the shopping information at least identifies a product or service within a vicinity of the geographic identifier. The geographical identifier may comprise a zip code received from the mobile device, a global positioning system (GPS) identifier received from the mobile device, or a zip code associated with the user.

In general, shopping information may include at least one of a name of a product, a rating of the product, a review of the product, an identifier for a merchant for the product, a geographical location of the merchant, an availability of the product, and a price for the product.

Another embodiment may be directed to providing shopping information over a network, comprising providing shopping information to a mobile device associated with a user based at least on a preference indicated in a user profile or a profile associated with members of a social network to which the user belongs. Shopping information may therefore be customized for the user.

In this embodiment, the method may include registering the user profile on a server, wherein the profile includes a mobile device identifier; sending a confirmation identifier to a mobile device identified by the mobile device identifier; and identifying a user based on a call made from the mobile device or on the confirmation identifier. In one embodiment, the confirmation identifier may be a code for entering in a field on a web site. Entry of a correct identifier may permit access to input, amend or update the user profile on the server.

Another embodiment may be directed to providing shopping information over a network, comprising generating a user profile comprising one or more user preferences usable for generating customized audio-based shopping information to be sent over the network to a mobile device associated with the user, wherein generating the user profile includes selecting, by the user, a voice from a plurality of available voices for the audio-based shopping information. Selecting the voice may include paying a fee. Generating the user profile may include providing, by the user, one or both of an identification of one or more products or services owned by the user; and an identification of one or more products or services wanted by the user, or the like. The user preferences may include personal information about the user including one or more of age, gender and address, products owned and/or reviewed, social network of friends, privacy settings, birth date, login statistics, last login, history of actions, login tally, or the like.

Another embodiment may be directed to providing shopping information over a network, comprising: receiving, from a user, information usable to generate audio-based shopping information that is customized for the user; and providing the customized audio-based shopping information over the network to a mobile device associated with the user; wherein an amount of audio advertisements included in the audio-based shopping information varies based on a subscription level of a user. Thus, a user may effectively customize the extent to which audio advertisements are included in a shopping information service by selecting a subscription level. Further, a web-based graphical user interface (GUI) may be provided to receive the user information, and an amount of web advertisements displayed on the GUI may vary based on a subscription level of a user.

Another embodiment may be directed to providing shopping information over a network, comprising receiving, from a user, a live audio-based review of a product or service; generating, based on the received audio-based review, a text-based review; and providing shopping information over the network based on the text-based review. For example, providing shopping information may include one or more of: displaying the text-based review on a website; generating, based on the text-based review, audio-based data for sending over the network; and sending the original audio-based review over the network. Thus, review information may be provided live and/or in substantially real-time by the user (e.g., soon after purchasing a product or service, or the like). This information may be made available over the network in one or more formats in an efficient manner.

Another embodiment may be directed to providing shopping information over a network, comprising navigating, based on user input at a mobile device, a shopping hierarchy which includes the shopping information; and generating, based on a navigated to location in the shopping hierarchy, an audio advertisement for a predetermined product or service, wherein the audio advertisement is customized by mapping user information onto a template. Thus one or more locations in the shopping hierarchy may be associated with a template usable for providing shopping information. In one embodiment, if a user selects a location in the shopping hierarchy, shopping information is automatically provided by mapping user information onto the template associated with that location. The shopping hierarchy may be navigated by keyword searching and/or browsing.

Another embodiment may be directed to account registration over a network, comprising registering for a user account; receiving a password over an email for the user account; receiving a verification code over a mobile network; logging into the user account with the password; and verifying, after logging in, the user account by entering the verification code. In one embodiment, the verification code may be sent in an SMS message. The user account may enable the user to enter voice preferences, reviews, ratings, or the like, in accordance with the present invention.

What is claimed as new and desired to be protected by Letters Patent of the United States is:

1. A method for providing shopping information regarding an item over a network to a mobile device, comprising:
   receiving at a server device shopping information that includes at least a review of the item by a user in at least one of a plurality of formats;
   employing the server device to transform the at least one received format of the shopping information into at least one other different format;
   enabling the user to select at least a portion of the shopping information in one of a plurality of selectable formats from a display that is determined by the server device based at least in part on a user input command at the mobile device, wherein the review is at least one selectable portion of the shopping information;
   receiving, from the mobile device associated with the user, a request for the server device to provide at least the selected portion of the shopping information for the item in the selected format, wherein audio is at least one of the plurality of selectable formats;

in response to the request, employing the server to prepare a summary of the selected portion of the shopping information for the item in the selected format based on personalized information that includes at least one of a user preference, user identity, and a user behavior that are accessible to the server device; and providing from the server device to the mobile device, in response to the request, at least the summary of the selected portion of the shopping information in the selected format.

2. The method of claim 1, wherein the item comprises a product or a service.

3. The method of claim 1, wherein enabling the user to select at least the portion of the shopping information comprises:

generating a voice advertisement based on a mapping of information about the user onto a template; and sending, to the mobile device, the voice advertisement, wherein the voice advertisement provides a prompt for entering the user input command.

4. The method of claim 3, further comprising:

varying an amount of the voice advertisement based on a subscription level of the user.

5. The method of claim 1, further comprising:

enabling the user to select a voice from a plurality of available voices; and generating a user profile based on the selected voice, wherein the user profile is usable in providing the shopping information in audio.

6. The method of claim 1, wherein enabling the user to select at least the portion of the shopping information comprises:

receiving, from the mobile device, a navigated to location in a shopping hierarchy based on the user input command.

7. The method of claim 1, further comprising:

receiving a geographical identifier, wherein providing the shopping information is further based on the geographical identifier.

8. The method of claim 1, further comprising:

receiving a mapping between a hot key input and shopping data, wherein the mapping is associated with the user, and wherein the user input command comprises an activation of the hot key input.

9. An apparatus for providing shopping information regarding an item over a network to a mobile device, comprising:

a transceiver for communicating data over the network;

a processor configured to perform operations comprising:

receiving at a server device shopping information that includes at least a review of the item by a user in at least one of a plurality of formats;

employing the server device to transfer the at least one received format of the shopping information into at least one other different format;

enabling the user to select at least a portion of the shopping information in one of a plurality of selectable formats from a display that is determined by the server device based at least in part on a user input command at the mobile device, wherein the review is at least one selectable portion of the shopping information;

receiving, from the mobile device associated with the user, a request for the server device to provide at least the selected portion of the shopping information for the item in the selected format, wherein audio is at least one of the plurality of selectable formats;

in response to the request, employing the server to prepare a summary of the selected portion of the shopping information for the item in the selected format based on personalized information that includes at least one of a user preference, user identity, and a user behavior that are accessible to the server device; and providing from the server device to the mobile device, in response to the request, at least the summary of the selected portion of the shopping information in the selected format.

10. The apparatus of claim 9, wherein enabling the user to select at least the portion of the shopping information comprises:

generating a voice advertisement based on a mapping of information about the user onto a template;

sending, to the mobile device, the voice advertisement, wherein the voice advertisement provides a prompt for entering the user input command.

11. The apparatus of claim 9, wherein the shopping information includes an audio advertisement portion and another portion about the item, and wherein the audio advertisement portion is aurally distinguishable from the other portion about the item.

12. The apparatus of claim 9, wherein the operations further comprises:

enabling the user to select a voice from a plurality of available voices; and generating a user profile based on the selected voice, wherein the user profile is usable in providing the shopping information in audio.

13. The apparatus of claim 9, wherein the operations further comprises:

receiving a mapping between a hot key input and shopping data, wherein the mapping is associated with the user, and wherein the user input command comprises an activation of the hot key input.

14. The apparatus of claim 9, wherein the request comprises at least one of a Universal Product Code (UPC) entry, a spelling entry, a key input, a barcode entry, or a spoken entry.

15. A system for providing shopping information regarding an item over a network to a mobile device, comprising:

a mobile device associated with a user configured to perform operations comprising:

enabling the user to select at least a portion of the shopping information in one of a plurality of selectable formats from a display that is determined by the server device based at least in part on a user input command at the mobile device; and the server device in communication with the mobile device, the server device configured to perform operations comprising:

receiving shopping information that includes at least a review about the item by a user in at least one of a plurality of formats;

employing the server device to transform the at least one received format of the shopping information into at least one other different format;

receiving, from the mobile device, a request for the server device to provide at least the selected portion of the shopping information for the item in the selected format, wherein audio is at least one of the plurality of formats, wherein the review about the item is at least one selectable portion of the shopping information;

in response to the request, employing the server to prepare a summary of the selected portion of the shopping information for the item in the selected format based on personalized information that includes at least one of a user preference, user identity, and a user behavior that are accessible to the server device; and
providing from the server device to the mobile device, in response to the request, at least the summary of the selected portion of the shopping information in the selected format.

16. The system of claim 15, wherein the at least one of the plurality of formats of the received review comprises audio or video.

17. The system of claim 15, wherein the information about the item includes a review, a rating, a store location providing the item, or directions to the store.

18. The system of claim 15, wherein providing to the mobile device the at least the requested portion of the shopping information is based on a subscription level of the user.

19. The system of claim 15, wherein the mobile device is further configured to perform operations comprising:
sending a geographical identifier associated with the mobile device to the server, wherein providing the shopping information is further based on the geographical identifier.

20. The system of claim 15 further comprising a client device configured to perform operations comprising:
sending a mapping between a hot key input and shopping data, wherein the mapping is associated with the user, and wherein to user input command comprises an activation of the hot key input.

* * * * *

UNITED STATES PATENT AND TRADEMARK OFFICE
CERTIFICATE OF CORRECTION

PATENT NO.        : 8,244,589 B2                                              Page 1 of 1
APPLICATION NO.   : 11/846150
DATED             : August 14, 2012
INVENTOR(S)       : Daevid Vincent et al.

It is certified that error appears in the above-identified patent and that said Letters Patent is hereby corrected as shown below:

In column 3, line 17, delete "embodiment" and insert -- embodiment, --, therefor.

In column 9, line 47, delete "like" and insert -- like. --, therefor.

In column 11, line 36, delete "to by" and insert -- to be --, therefor.

In column 11, line 49, delete "form" and insert -- from --, therefor.

In column 14, line 25, delete "product. the" and insert -- product. The --, therefor.

In column 17, line 63, delete "of" and insert -- of: --, therefor.

In column 18, line 62, delete "the a" and insert -- the --, therefor.

In column 21, line 56, in Claim 9, delete "transfer" and insert -- transform --, therefor.

Signed and Sealed this
Thirtieth Day of October, 2012

David J. Kappos
*Director of the United States Patent and Trademark Office*